United States Patent

[11] 3,619,725

[72] Inventors Ralph Robert Soden
Mendham;
William John Greig, Somerville, both of N.J.
[21] Appl. No. 26,627
[22] Filed Apr. 8, 1970
[45] Patented Nov. 9, 1971
[73] Assignee RCA Corporation

[54] ELECTRICAL FUSE LINK
3 Claims, 2 Drawing Figs.

[52] U.S. Cl. 317/101 A, 317/235, 29/574, 117/212
[51] Int. Cl. H01l 19/00
[50] Field of Search 317/101 A, 235 (53), 235 (22), 235 (5.4); 117/212; 337/297; 29/574, 591

[56] References Cited
UNITED STATES PATENTS

| | | | |
|---|---|---|---|
| 3,303,400 | 2/1967 | Allison | 317/101 A UX |
| 3,426,252 | 2/1969 | Lepselter | 317/234 (5.3) UX |
| 3,441,804 | 4/1969 | Klemmer | 317/101 A UX |
| 3,449,825 | 6/1969 | Loro | 317/234 (5.3) UX |

*Primary Examiner*—David Smith, Jr.
*Attorney*—Glenn H. Bruestle

ABSTRACT: A fuse link is included in the interconnection circuit pattern of an integrated circuit. The fuse link includes a thin film of titanium with or without a thin film of platinum on the titanium film. The highly conductive metal film of the interconnection circuit pattern extends over the fuse film at the end of the fuse link and provides the contacts for the fuse link.

INVENTORS
RALPH R. SODEN &
WILLIAM J. GREIG
BY Donald S. Cohen
ATTORNEY

ELECTRICAL FUSE LINK

BACKGROUND OF INVENTION

The present invention relates to an electrical fuse link and more particularly to a thin film fuse link for use in the interconnection pattern of an integrated circuit.

In integrated circuits it is often desirable to include in the circuit one or more fuses. Such fuses can be used either to protect certain parts of the circuit from becoming overloaded or to permit the intentional disconnection of certain elements of the circuit by passing a current of a desired value through the circuit. In providing a fuse for an integrated circuit the following factors must be considered in the design of the fuse:

a. Since the fuse is provided in the interconnection pattern of the circuit it is desirable that the fuse is made of a material which is compatible with the material of the interconnection pattern so as to minimize the number of steps required to form the fuse.

b. The fuse must be of a material which will blow when the desired current passes through the fuse so as to insure proper operation of the fuse.

c. The fuse should be of a material which permits varying the construction of the fuse to achieve a selection of blow current over a wide range of currents.

d. The fuse should be capable of being made very small so as to take up a minimum amount of space in the circuit yet which will properly operate.

SUMMARY OF THE INVENTION

A fuse on a substrate in which the fuse includes a pair of spaced metallic film contacts and a titanium fuse film electrically connected to and extending between the contacts. The contacts are of a metal whose conductivity is greater than that of the titanium fuse film. The titanium fuse film is dimensioned to blow when a desired current passes through the fuse film.

DETAILED DESCRIPTION

Figure 1:
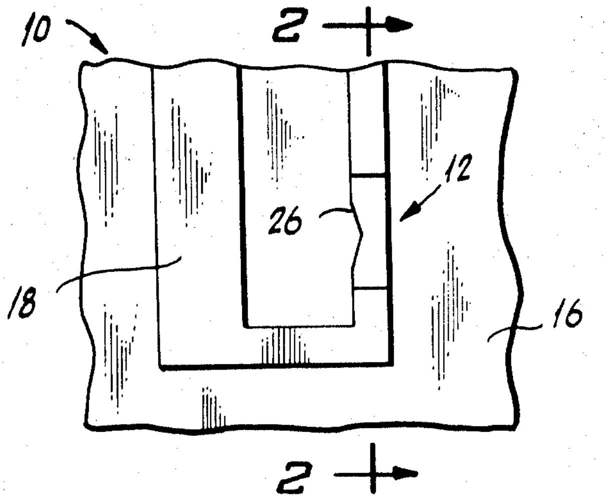
FIG. 1 is a top plan view of a portion of an integrated circuit including the fuse link of the present invention.

Referring to the drawing, there is shown a portion of an integrated circuit, generally designated as 10, which includes a form of the fuse link of the present invention, generally designated as 12. The integrated circuit 10 comprises a substrate 14 of a semiconductor material, such as silicon, in which is provided various active and passive electrical components, such as transistors, diodes, resistors etc., which are not shown since they form no part of the present invention and are well known in the art. A layer 16 of an electrical insulating material, such as silicon oxide, silicon nitride, aluminum oxide or combinations of these materials, is provided on the surface of the substrate 14. An interconnection circuit pattern 18 of an electrically conductive material is provided on the insulated layer 16. The interconnection circuit pattern 18, only a portion of which is shown, electrically connects the various electrical components in the substrate 14 in a desired circuit arrangement. The fuse link 12 is provided in the interconnection circuit pattern 18.

Figure 2:
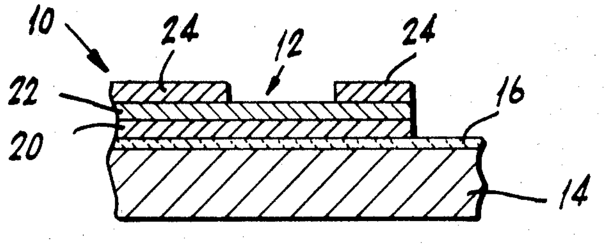
FIG. 2 is a sectional view taken along line 2—2 of FIG. 1.

As shown in FIG. 2, the fuse link 12 comprises a film 20 of titanium on the insulating layer 16 and a film 22 of platinum over the titanium film 20. A thin film 24 of a metal which has a conductivity higher than that of titanium, such as gold, is on the platinum film 22 and extends up to the opposite ends of the fuse link 12. The highly conductive film 24 provides the contacts for the fuse link 12. As shown in FIG. 1, the titanium and platinum films 20 and 22 of the fuse link 12 may be provided with a portion of narrower width by providing a notch 26 in a side edge of the layers. This provides the fuse link 12 with a narrow portion which will more readily blow when a current of the desired value passes through the fuse link.

As shown in FIG. 2, the titanium and platinum films 20 and 22 of the fuse link 12 extend beyond the ends of the fuse link and are part of the interconnection circuit pattern 18 along with the highly conductive film 24. As will be explained, the fuse link films 20 and 22 are included as part of the interconnection circuit pattern 18 so as to facilitate the forming of the fuse link 12 as part of the circuit pattern. In the use of the integrated circuit 10, the current passing through the interconnection circuit pattern 18 will flow through the highly conductive film 24. However, when the current reaches the fuse link 12 it must then flow through the higher resistance films 20 and 22 of the fuse link.

The current passing through the fuse link 12 causes a heating of the fuse link films. When a current of a critical value, depending on the particular resistance value geometry and purity, of the fuse link, passes through the fuse link, the fuse link films 20 and 22 will be heated sufficiently to cause the fuse link films to blow or melt. This opens the fuse link and thereby discontinues the flow of current through at least the portion of interconnection circuit pattern which contains the fuse link. Since the critical or blow current depends on the particular resistance of the fuse link 12, a desired blow current can be obtained by adjusting the resistance of the fuse link 12. The resistance of the fuse link 12 can be adjusted by varying the thickness of one or both of the fuse link films 20 and 22. To obtain a fuse link 12 of relatively high resistance value, the platinum film 22 can be removed so that the fuse link 12 comprises only the titanium film 20.

Table I shows some resistance values which can be obtained with fuse link films 20 and 22 of various thicknesses and the blow current for each such fuse link. Each of the fuse links shown in Table I was 0.0005 inches in length, 0.0003 inches in width and had a minimum width at the bottom of the notch 24 of 0.00015 inches.

TABLE I

| Thickness of Film (Angstroms) | | Resistance (ohms) | Blow Current (Milliamps) |
|---|---|---|---|
| Platinum | Titanium | | |
| 1,500 | 1,200 | 2.5 | 240 |
| 1,100 | 1,200 | 5 | 120 |
| 750 | 1,200 | 6 | 100 |
| 500 | 1,200 | 10 | 75 |
| 250 | 1,200 | 20 | 45 |
| | 1,200 | 15 | 70 |
| | 750 | 35 | 50 |
| 1,200 | 500 | 3 | 180 |
| 1,200 | 250 | 3 | 160 |
| 850 | 250 | 7 | 100 |
| 500 | 500 | 8 | 50 |

As previously stated, the titanium and platinum films 20 and 22 of the fuse link 12 are also included in the interconnection circuit pattern 18. Thus, the fuse link 12 can be formed simultaneously with the interconnection circuit pattern 18. The interconnection circuit pattern 18 and the fuse link 12 are formed on the integrated circuit 10 after the various electrical components are formed in the substrate 14. The insulating layer 16 is generally formed on the substrate 14 during the forming of the various electrical components in the substrate and has openings therethrough where it is desired to provide an electrical connection between the the interconnection circuit pattern 18 and an electrical component in the substrate 14.

The interconnection circuit pattern 18 and the fuse link 12 can be formed by first applying a layer of titanium of the desired thickness over the entire surface of the insulating layer 16 and over the areas of the surface of the substrate exposed by the openings in the insulating layer. The titanium layer may be applied by either of the well known techniques of evaporation or sputtering in a vacuum. A layer of platinum of the desired thickness is then coated on the entire surface of the titanium layer. The platinum layer may likewise be applied by either evaporation or sputtering in a vacuum. A masking layer of a suitable resist material is then applied by standard photolithographic techniques to the area of the platinum layer which is to form the interconnection circuit pattern 18 and the fuse link 12. The exposed area of the platinum layer is then removed such as by etching with aqua regia, and the masking layer is removed with a suitable solvent.

A masking layer of a suitable resist material is then applied by standard photolithographic techniques to the area of the titanium layer which was exposed when the platinum layer was removed and to the area of the platinum layer where the fuse link 12 is to be provided. The layer 24 of the highly conductive metal, such as gold, is then coated over the exposed area of the platinum layer, such as by electroplating. The masking layer is then removed by a suitable solvent, and the exposed area of the titanium layer is then removed, such as by etching with an aqueous solution of sulfuric acid. This leaves the titanium layer 20, platinum layer 22 and highly conductive metal layer 24 in the form of the interconnection circuit pattern 18 and the fuse link 12. If the fuse link 12 is to be formed solely of the titanium layer 20, the portion of the platinum layer 22 at the fuse link 12 can be removed either by chemically etching with aqua regia or by the well-known technique of sputter etching.

Thus, it can be seen that the fuse link of the present invention has the advantages that it can be easily made to blow at any desired current over a wide range of blow currents by varying the thicknesses of the titanium layer 20 and the platinum layer 22 so as to vary the resistance of the fuse link, and it can be easily formed in the interconnection circuit pattern 18 since it is formed simultaneously with the interconnection circuit pattern. In addition, the use of titanium and platinum for the fuse link 12 has other advantages. The melting temperatures of titanium and platinum are close, within about 100° of each other, so as to minimize inhomogeneous melting when blowing the fuse link. Titanium and platinum have nearly equal thermal coefficients of expansions so as to minimize failure during temperature cycling. Titanium has a thermal conduct which is much lower than that of platinum so that the titanium acts as a barrier to heat transfer to the substrate. This maintains most of the heat generated in the fuse link by the current flowing through the fuse links so as to minimize the power required to blow the fuse link. Also, the reaction between the titanium and the platinum under blow conditions enhances melting the fuse because of the excess heating of mixing so as to further minimize the power required to blow the fuse link.

We claim:

1. In an integrated circuit device which includes a substrate of a semiconductor material, a layer of an electrical insulating material on a surface of the substrate and an electrically conductive interconnection circuit pattern on the insulating material layer, a fuse link electrically connected within the interconnection circuit pattern with the interconnection circuit pattern being electrically connected to the ends of the fuse link to provide the contacts for the fuse link, said fuse link comprising a fuse film of titanium on the surface of the insulating material layer and being dimensioned to blow where a desired current passes through the fuse film, and the interconnection circuit pattern comprising a film of titanium on the insulating material layer, a film of platinum on the titanium film and a film of a highly conductive metal on the platinum film, the titanium fuse film being an extension of the titanium film of the interconnection circuit pattern and the highly conductive film of the interconnection circuit pattern extending only up to the ends of the fuse link.

2. A device in accordance with claim 1 in which the fuse link includes a fuse film of platinum over the titanium fuse film with the platinum fuse film being an extension of the platinum film of the interconnection circuit pattern.

3. A device in accordance with claim 2 in which the highly conductive film of the interconnection circuit pattern is a film of gold.